BISTABLE COMPARATOR MEANS WITH MEANS FOR SELECTIVELY HOLDING THE COMPARATOR MEANS IN AN OUTPUT CURRENT STATE

Filed Dec. 30, 1963 2 Sheets-Sheet 1

INVENTOR.
JAMES H. DOYLE
BY Noel G. Conway
ATTORNEY

Oct. 25, 1966 J. H. DOYLE 3,281,608

BISTABLE COMPARATOR MEANS WITH MEANS FOR SELECTIVELY HOLDING THE COMPARATOR MEANS IN AN OUTPUT CURRENT STATE

Filed Dec. 30, 1963 2 Sheets-Sheet 2

INVENTOR.
JAMES H. DOYLE
BY Noel G. Conway
ATTORNEY

United States Patent Office 3,281,608
Patented Oct. 25, 1966

3,281,608

BISTABLE COMPARATOR MEANS WITH MEANS FOR SELECTIVELY HOLDING THE COMPARATOR MEANS IN AN OUTPUT CURRENT STATE

James H. Doyle, Garden Grove, Calif.
(2003 Ivy Hill Lane, Orange, Calif.)

Filed Dec. 30, 1963, Ser. No. 334,336
11 Claims. (Cl. 307—88.5)

This invention relates to digital comparator circuits and more particularly to bistable comparator circuits utilizing a controllable amount of hysteresis amplitude for holding, or locking, the comparator circuits in a current state.

This application is a continuation-in-part of my earlier filed application Serial No. 187,989, filed April 16, 1962 entitled Digital Synchronizer, now abandoned.

Devices for synchronizing digital circuits such as analog to digital converters may include a control means for locking each of the output states of the digital circuit in a current state. Such a control is necessary to be able to read out the current state of each of the bistable comparator circuits of a digital data processing system. In presently known comparators for providing an output signal indicative of one of two states determined by an input signal, the sampling and holding of the intelligence of the state requires extensive associated gating circuitry. Also in systems which are asynchronous, additional auxiliary circuitry is required to convert the system to a synchronous one. Such circuitry is complicated and unreliable. Accordingly, it is an object of this invention to provide an improved means for sampling intelligence at the output of a comparator circuit.

In patent application, Serial No. 333,972, filed December 27, 1963, by the same inventor, entitled Electronic Quantizer, which application is a continuation application of the now abandoned patent application filed by the present inventor on February 5, 1962, for an Electronic Quantizer, Serial No. 172,377 there is described a comparator circuit containing a hysteresis circuit for preventing the comparator from switching when signals are less than one half the least significant bit in magnitude. In that device a resistor circuit was utilized to introduce a small positive feedback from the output to the input of the comparator circuit to prevent undesirable switching of the circuit.

The device of the present invention maintains the output of a bistable comparator in a current state or determined by an input signal by expanding the amplitude of hysteresis feedback in the circuit to inhibit the comparator from changing the state as previously established. A simple and reliable circuit is provided to expand the amount of hysteresis feedback to prevent the comparator from changing state upon receipt of a control signal at its input. Therefore, the intelligence which was at the output of the comparator at the time of the increase in amplitude of the hysteresis circuit is maintained at its current state. A transistor switch responsive to a control signal causes an increase in the hysteresis amplitude which operates to inhibit any change in state of the comparator by subsequent signals.

It is therefore another object of this invention to provide a circuit for varying the hysteresis amplitude in a bistable circuit.

It is another object of this invention to provide a digital synchronizer circuit for clamping the output of a bistable circuit.

It is a further object of this invention to provide means for controlling the amount of hysteresis feedback in a comparator circuit.

It is a still further object of this invention to control the magnitude of hysteresis feedback in a comparator circuit to inhibit a change of state of the comparator.

Other objects will become apparent and a better understanding of the invention may be had by reference to the accompanying drawings and description in which FIGURE 1 is a block diagram illustrating the principal aspects of the invention;

According to a principal aspect of the invention, there is provided a digital synchronization circuit for clamping a bistable comparator circuit in a current state. The comparator circuit comprises a bistable circuit including positive hysteresis feedback between the output and input to enhance the switching of states. Means are provided in response to control signal for increasing the hysteresis amplitude to a point above the maximum excursion amplitude of the input signal to the comparator. The comparator is thereby inhibited from changing states by the hysteresis amplitude and will maintain its current state until removal of the control signal.

According to another aspect of the invention, there is provided a diode limiting circuit connected to the input of the comparator circuit for limiting the excursion range of the input signal between predetermined limits. In this manner, the amount of hysteresis amplitude may be limited to a sufficient amplitude to overcome the range established by the diode limiting circuit.

Figure 1:
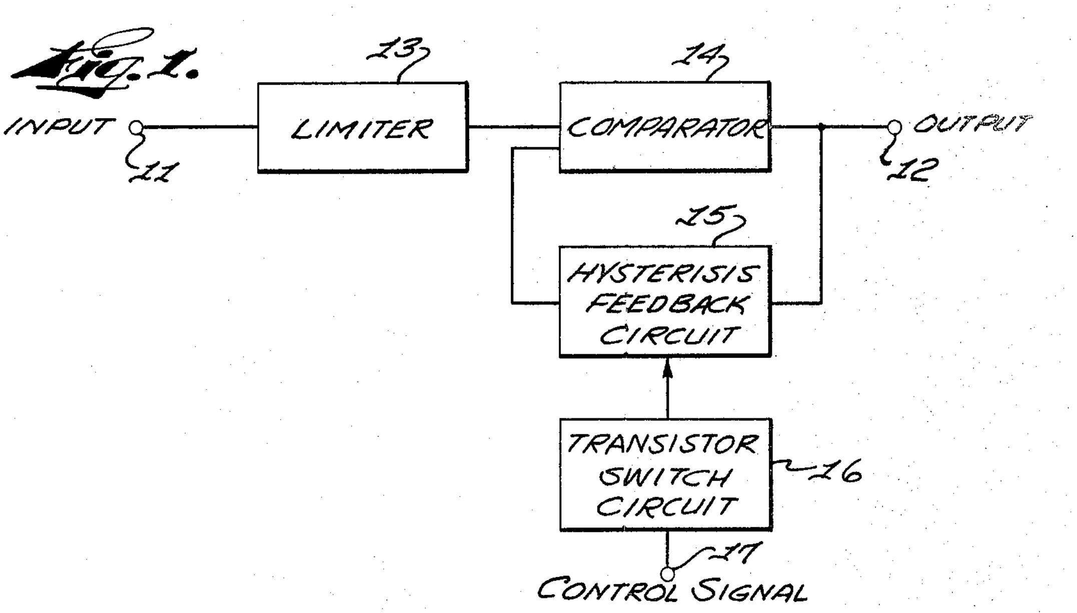

Referring now to FIGURE 1, there is illustrated in block form a device according to the invention. In FIGURE 1 a comparator 14 is partially responsive to an analog input signal at the terminal 11 connected through a limiter 13 to provide an output at the terminal 12. The comparator 14 may be, for example, a comparator bistable circuit such as is found in data processing systems which serve the function of being switched from one state to another upon receipt of an input signal at a given threshold level. One of two output states is provided at the terminal 12 indicative of binary digital intelligence.

A hysteresis circuit 15 is connected between the output and a feedback input of the comparator 14 to provide a predetermined amount of positive feedback to enhance the switching of states of the comparator 14. A transistor switch circuit 16 responsive to a control signal 17 is connected to the hysteresis feedback circuit 15 to selectively increase the hysteresis amplitude applied to the comparator 14. Upon application of the control signal at terminal 17, the transistor switch circuit 16 controls the hysteresis feedback circuit 15 to provide a sufficient hysteresis amplitude to inhibit the comparator 14 from changing states and thereby establishing the output terminal 12 in its present state. Thus, for example, an input signal at the terminal 11 may switch the comparator 14 to a state indicative of a binary one. The binary one is maintained at the output terminal 12 regardless of subsequent input signals to the terminal 11 by the actuation of the transistor switch circuit 16 to provide a sufficient hysteresis amplitude to the hysteresis feedback circuit 15 to maintain the comparator 14 in its current state. The amount of hysteresis amplitude required to prevent the comparator 14 from changing states is determined by the limiter 13 which establishes the excursion range of the input signal.

Figure 2:
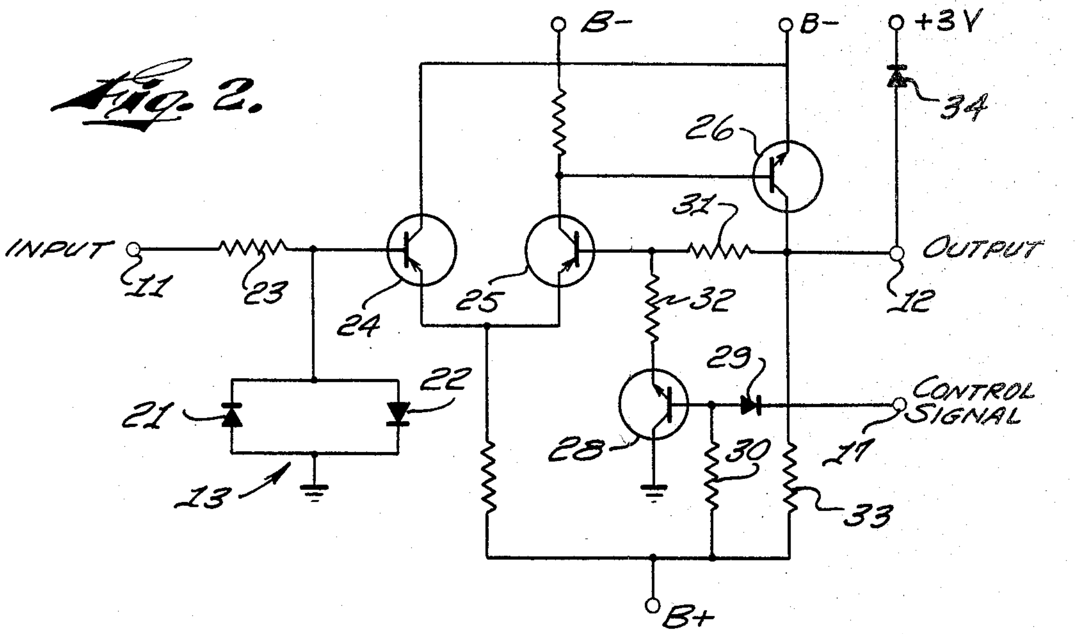
FIGURE 2 is a circuit diagram of a preferred embodiment of the invention.

Referring now to FIGURE 2, there is illustrated a circuit diagram of a preferred embodiment of the device of FIGURE 1. In FIGURE 2 a pair of transistors 24 and 25 are connected in common through their emitter to provide a difference amplifier. A transistor 26 having its control electrode connected to an output electrode of the transistor 25 operates with the transistors 24 and 25 to provide the bistable circuit operation of the comparator 14 of FIGURE 1. The analog input signal to terminal 11 is connected through a resistor 23 to the control electrode of the transistor 24. A reference bias voltage may be established on the control electrode of the transistor 24 through the resistor 23. The control electrode of the transistor 24 is also connected through a pair of opposite polarity diodes 21 and 22 to a ground terminal. The diodes 21 and 22 combine to provide the limiter 13 of FIGURE 1. A positive feedback circuit is connected between the output electrode, i.e., the collector, of a transistor 26 and the feedback input at the control electrode of transistor 25 and comprises a pair of resistor circuits. The first circuit comprises the resistor 31 having one end connected to the output electrode of the transistor 26 and the other end connected to the control electrode of the transistor 25 with the output electrode of the transistor 26 also connected through a resistor 33 to a B plus source. the other circuit comprises a resistor 32 connected at one end to the control electrode of the transistor 25, and connected at the other end to ground through a transistor 28, which transistor selectively interrupts said circuit to increase the hysteresis. By way of example only, resistor 31 may be 10K ohms, resistor 32 may be 100 ohms, and resistor 33 may be 5.6K ohms. A diode switch 29 connects the control electrode of the transistor 28 to the control signal terminal 17. A resistor 30 also connects the B plus terminal to the control electrode of the transistor 28. In the illustrated circuit, the transistor 28 is connected and operated as an inverted switch.

Positive feedback to establish a predetermined hysteresis amplitude to enhance switching action is provided by the resistor networks of FIGURE 2 including the resistors 31 and 33 connected between the control electrode of the transistor 25, the output electrode of transistor 26 and the B plus source. With the transistor 28 rendered into a conductive condition by a control signal from the terminal 17 the hysteresis amplitude is determined by the resistor network of resistors 31 and 33 in parallel with the network between the ground source and the control electrode of the transistor 25 through the conducting transistor 28 at the resistor 32. With the transistor 28 in a conductive state, the amount of hysteresis amplitude is established to enhance the switching of the bistable circuit, but does not prevent switching of states by subsequent input signals applied to the input terminal 11. This is because the feedback signal through the resistor 31 is normally attenuated by being shunted to ground through the resistor 32 and transistor 28.

Upon applying a negative control signal at the terminal 17 the transistor 28 is turned off and the first resistor network connected in the feedback circuit between the transistors 26 and 25 effectively causes an increase in the hysteresis amplitude. By weighting the resistors properly, when the circuit between the ground source and the control electrode of the transistor 25 through the transistor 28 and the resistor 32 is interrupted, there is a corresponding increase in the hysteresis amplitude to the point where a subsequent signal (within the limits established by limiter 13) at the control electrode of the transistor 24 through the input terminal 11 is not sufficient to switch the bistable circuit.

The diode limiter circuit 13 maintains the excursion of the input signal 11 as applied to the control base of 24 within the range as established by the forward impedance characteristics of the diodes 21 and 22 which may be, for example, established to prevent excursion beyond plus or minus one volt at the control electrode 24. Further, it should be noted that the limiter 13 centers the permitted range of inputs to transistor 24 about ground potential, and similarly, the hysteresis amplitude is normally centered about the same voltage level by the fact that the collector of the transistor 28 is connected to ground potential. The hysteresis amplitude as established by the application of the control signal at the terminal 17 is beyond the excursion range established by the limiter 13.

In operation of the circuit of the FIGURE 2 assuming that a negative signal at the control electrode 24 is indicative of a binary one, the signal causes conduction in the transistor 24 and non-conduction in the transistor 25 and non-conduction in the transistor 26 whereupon the B+ provides a positive signal at the output terminal 12 indicative of a binary one. The positive signal at the output terminal 12 is limited to +3 volts by diode 34 and the +3 volt source shown. The circuit is such that, with the transistor 28 conducting, the positive feedback from the output of the transistor 26 to the control electrode of the transistor 25 is sufficient to enhance the switching of the bistable circuit, but, since it is attenuated by being shunted through the circuit of resistor 32, input signals within the excursion range established by the limiter 13 can switch the output of the comparator. Thus upon receipt at the input terminal 11 of a positive signal indicative of binary zero transistor 24 is cutoff causing conduction in the transistor 25 and conduction of the transistor 26 with the output at terminal 12 switching from the positive state to the negative state by the B− connected to the emitter of transistor 26.

Assuming now that, while the output terminal 12 is negative, the negative control signal from the terminal 17 is applied, the transistor 28 is cutoff, removing the attenuation of the circuit of the resistor 32 and providing a more negative potential on the control electrode of transistor 25. This establishes a sufficient amount of positive hysteresis amplitude beyond the range established by the limiter 13 to prevent switching of the bistable circuit. A subsequent signal at the input terminal 11 of either polarity will have no effect on the transistors 24 and 25 due to the aforedescribed hysteresis amplitude.

Conversely, if the transistor 28 is cut off when the output at terminal 12 is positive, the amount of positive signal fed through the resistor 31 to the control electrode of transistor 25 makes said electrode sufficiently positive to prevent subsequent changes of the output current state of the comparator by subsequent inputs at terminal 11 of either polarity.

Figure 3:
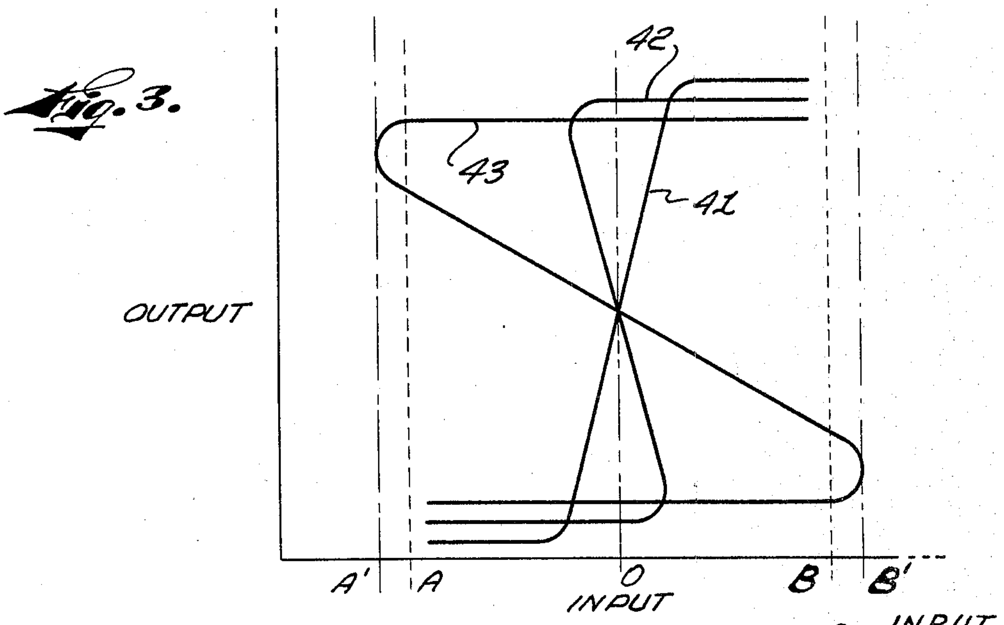
FIGURE 3 is a graph of the circuit of FIGURE 2 illustrating the hysteresis effect.

The action of the hysteresis circuit in FIGURE 2 can perhaps, best be understood by the description of the graph of FIGURE 3. The curve 41 illustrates the change of a bistable circuit without a hysteresis circuit from cutoff to saturation as its input voltage is carried through the mid-point to zero. The curve 42 illustrates the effect of a small amount of positive feedback in the hysteresis circuit for preventing indecision when input signals are marginal. This amount exists when no negative control signal at terminal 17 is being applied to the transistor 28 of FIGURE 2 causing conduction therein. Curve 43 illustrates the operation of the circuit of FIGURE 2 when the control signal is applied at the terminal 17*h* the transistor 28 causing non-conduction therein. The excursion of the curve 43 is such as to extend beyond the limits A and B to the limits $A^1$ and $B^1$. The limits A and B may be established to be equal to the limits determined by the diode limiter 13. Thus assuming the limit B is a positive one volt and the limit A is a negative one volt and that the diode limiter 13 has been determined to limit the signal at the control electrode of the transistor 24 between plus and minus one volt then it may be seen from the curve 43 of FIGURE 3 that the range zero to B and zero to A is not sufficient to switch a bistable circuit having the curve 43. In order to switch the circuit of FIGURE 2 having a curve 43, a signal input terminal at the control electrode 24 must extend between zero and $A^1$ and $B^1$, and therefore, the circuit of FIGURE 2 is maintained in its current since a voltage input between the limits A and B is not sufficient to switch the bistable circuit.

Figure 4:
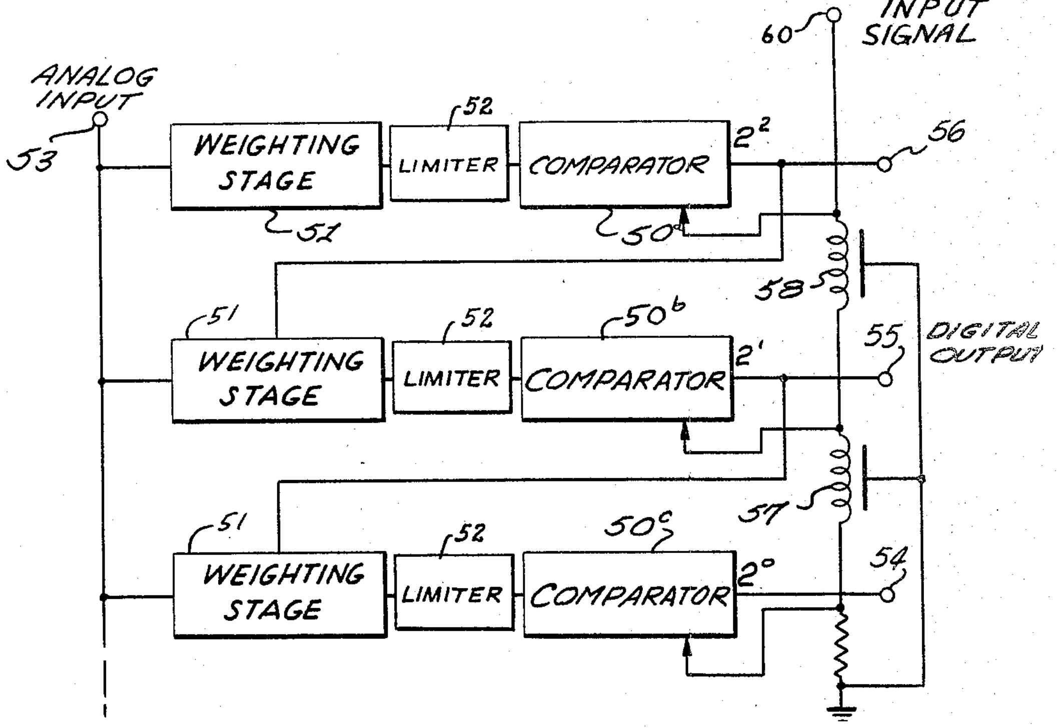
FIGURE 4 illustrates in block form a plurality of comparator circuits as shown in FIGURE 2 for providing data processing system.

Referring now to FIGURE 4, there is illustrated the operation of an embodiment of the digital synchronizer. In the circuit of FIGURE 4, a plurality of comparators 50 with associated limiters 52 are illustrated, each of the comparators comprising the circuit of FIGURE 2 with a limiter circuit 52. A plurality of weighting stages 51 each associated with the comparators 50 provide a data processing system for converting an analog input signal at the terminal 53 to digital output signals at the terminals 54, 55 and 56. Each of the comparators 50 may be utilized in data processing systems as an analog to digital converter for providing data intelligence in a binary system. For example, the comparator $50^a$ provided a $2^2$ output, $50^b$ a $2^1$ output and $50^c$ a $2^0$ output according to well known analog to digital converter circuit design. Each of the comparators 50 may be connected as described in FIGURE 2 to be responsive to a negative control signal from terminal 60 to prevent the comparators from changing states. Thus, upon application of an analog input signal to terminal 53 and the switching of the comparators 50*a*, 50*b*, and 50*c* to the state defining the correct binary output, a digital output signal appears at the terminals 54, 55 and 56. Now, when it is desired to maintain the output at its current state regardless of a change in the input terminal of 53, the negative signal is applied at terminal 60, and comparators 50*a*, 50*b*, and 50*c* are controlled as hereinbefore described in relation to FIGURE 2 to provide sufficient hysteresis amplitude to prevent change of state of the comparators. A subsequent analog input signal at the terminal 53 is prevented from changing the state of the comparators and the output signals at terminals 54, 55 and 56 are maintained in their current states.

The delay lines 57 and 58 are introduced for the purpose of reducing aperture time to extremely short periods. The time period of each delay line results in a successive stopping of an asynchronous system causing the aperature time to approach zero thereby increasing the speed of operation. As shown, it is preferred that the highest ordered binary output is clamped first and then each successively lower ordered binary output is successively clamped.

The described comparator circuit and means for varying the hysteresis amplitude of the positive feedback circuit is a simple and reliable circuit for use in both synchronous and asynchronous digital data processing systems to allow clamping of the output digital signal for sampling or readout as desired. The system has particular applicability to asynchronous systems for synchronizing the digital output.

While the invention has been shown and described herein in only a few specific embodiments, it will be apparent to those skilled in the art that the invention is not limited to the specific combinations shown, and numerous changes thereto may be made without departing from the spirit of the present invention. Accordingly, the invention is to be limited solely by the scope of the appended claims.

I claim:

1. Bistable comparator means with means for selectively holding the comparator means in an output current state comprising:

a bistable comparator having an input to receive an analog input signal and an output at which appears a current state normally determined by said analog input signal, said comparator having a bistable part including a hysteresis circuit for providing positive feedback in response to the comparator output to enhance the switching of said bistable part of the comparator;

means connected to the input of said comparator for limiting the input signal to a predetermined excursion range of amplitude;

holding means connected to said hysteresis circuit for increasing the amplitude of hysteresis of said hysteresis circuit beyond said excursion range, whereby said bistable comparator is inhibited from changing output states by subsequent input signals; and control signal means connected to said holding means to provide selective control of said inhibiting condition.

2. A plurality of circuits as set forth in claim 1 connected to a common analog input signal;

wherein said central signal means includes delay means in said control signal means for causing the control signal of said control signal means to be applied to said holding means of each respective circuit successively.

3. The means set forth in claim 1 wherein said limiting means comprises a pair of diode limiters poled in opposite polarity connected between a source of potential and the input of said bistable comparator, said diodes having predetermined forward impedance characteristics for establishing said excursion range.

4. Bistable comparator means with means for selectively holding the bistable part of the comparator means in an output current state comprising:

a plurality of bistable comparators, each said bistable comparator having input and output transistor circuits for providing bistable operation responsive to input signals applied to said input transistor circuit, each said comparator having an input line for receiving an analog input signal, each said bistable part of each comparator having positive feedback circuit means from said output transistor circuit to said input transistor circuit for providing a feedback hysteresis amplitude; limit means connected to each input line for limiting the excursion amplitude range of said input signals to a predetermined range;

holding means connected to said feedback circuit means of each bistable comparator for removing attenuation from said feedback circuit sufficiently to inhibit said bistable comparator from changing output state in response to input signals within the limited range of amplitude; and control signal means connected to said holding means to selectively control the removal of attenuation from said feedback circuit.

5. The means of claim 4 wherein each said input transistor circuit comprises first and second transistors having a common emitter connection, the control electrode of said first transistor connected to a respective input line to be responsive to input signals for controlling conduction in said first and second transistors;

and wherein said output transistor circuit comprises a third transistor having a control electrode responsive to the conductive state of said second transistor and an output electrode for providing a signal indicative of the current state of said bistable circuit;

and wherein said positive feedback circuit means is connected between the output electrode of said third transistor and the control electrode of said second transistor.

6. The means set forth in claim 5 wherein said positive feedback circuit means includes a resistor connected between said output circuit and the control electrode of said second transistor and a resistor connected between the control electrode of said second transistor and said holding means; and wherein said holding means for increasing the amplitude of said hysteresis includes a fourth transistor connected between said last mentioned resistor and ground, said fourth transistor having a control electrode connected to the control signal terminal for receiving a selective control signal from a remote source, said fourth transistor being biased to be conducting in absence of a control signal and to be nonconducting upon application of said control signal.

7. The means of claim 4 wherein said comparators are connected to a common analog input signal; and said control signal means includes delay means for causing the control signal of said control signal means to be applied to said holding means of each respective comparator successively.

8. The bistable comparator means set forth in claim 4 wherein the plurality of bistable comparators are connected to a common analog input and the output of said comparators are indicative of a binary coded output from a highest ordered binary output to a lowest ordered binary output;

and wherein said control means includes delay means connected for causing said control signal to be applied first to the comparator with the highest ordered binary output and then successively to the comparators having the successively lower ordered binary outputs.

9. In a bistable comparator having an input transistor circuit with a first input to receive an analog input signal and a second input to receive a positive feedback signal and an output transistor circuit with an output at which appears one of the two output current states of the comparator, the output current state of the comparator being responsive to the output state of the input transistor circuit, said input transistor circuit being normally partially responsive to the signal at said analog input, said comparator having a feedback circuit connecting said comparator output with said second input so that said input transistor circuit is at least partially responsive to the comparator output signal which normally biases said input transistor circuit to inhibit a certain amount the switching of said input transistor circuit to provide a predetermined amount of hysteresis in the comparator:

input signal limiting means connected to said first input of said comparator for limiting the excursion range of amplitude of said input analog signal to a predetermined range;

and holding means connected to said feedback circuit for selectively increasing the amount of feedback signal to said second input sufficiently to bias said input transistor circuit beyond a point where the limited analog input signal cannot cause a subsequent change of the output state of said input transistor circuit and therefore the comparator output current state, said last mentioned means being connected to a control signal source to be responsive to a control signal to increase said feedback signal.

10. Bistable comparator means with means for selectively holding the comparator means in an output current state comprising: a difference amplifier consisting of first and second transistors, each having a base, emitter, and collector, said transistors having a common emitter connection; means including an input signal connected to the base of said first transistor for causing conduction in said first transistor and non-conduction in said second transistor when said input signal represents one state and for causing non-conduction in said first transistor and conduction in said second transistor when said input signal represents the other state, said second transistor having a control electrode; a third transistor having a control electrode responsively connected to said second transistor to cause conduction in said third transistor when said second transistor is conducting and to cause non-conduction in said third transistor when said second transistor is non-conducting, said third transistor having an output electrode being indicative of the state of said bistable comparator; positive feedback means including a resistor circuit connected between said output electrode of said third transistor and the control electrode of said second transistor to provide a hysteresis circuit amplitude; means connected to the base of said first transistor for limiting the excursion range of said input signal to a predetermined amplitude; and holding means connected to said positive feedback means for selectively increasing said hysteresis amplitude sufficiently to prevent said comparator from changing output state in response to input signals within the limited range of amplitude, said holding means being connected to a terminal to be responsive to a control signal at said terminal from a remote source to increase said hysteresis amplitude.

11. The circuit of claim 10 wherein said means for limiting the amplitude of said input signal less than said hysteresis amplitude comprises a pair of oppositely poled diodes connected to the control electrode of said first transistor to limit the amplitude of said input signal to a plus and minus amplitude range determined by the impedances of said diode limiting circuit.

References Cited by the Examiner

UNITED STATES PATENTS

| | | | |
|---|---|---|---|
| 2,967,951 | 1/1961 | Brown | 307—88.5 |
| 3,018,386 | 1/1962 | Chase | 307—88.5 |
| 3,058,068 | 10/1962 | Hinrichs et al. | 307—88.5 |
| 3,067,339 | 12/1962 | Poppelbaum | 307—88.5 |
| 3,113,219 | 12/1963 | Gilmore | 307—88.5 |
| 3,121,802 | 2/1964 | Palmer | 307—88.5 |
| 3,123,722 | 3/1964 | Ralphs | 307—88.5 |
| 3,151,256 | 9/1964 | Simon et al. | 307—88.5 |
| 3,175,211 | 3/1965 | Lee et al. | 307—88.5 |
| 3,176,148 | 3/1965 | Lampke | 307—88.5 |

JOHN W. HUCKER, *Primary Examiner.*

J. D. CRAIG, *Assistant Examiner.*